United States Patent [19]

Felter

[11] 4,017,026
[45] Apr. 12, 1977

[54] AUTOMATIC DAMPER

[76] Inventor: John V. Felter, P.O. Box 7464, Houston, Tex. 77008

[22] Filed: May 15, 1975

[21] Appl. No.: 577,682

[52] U.S. Cl. .................. 236/93 R; 236/1 G; 126/285 R; 126/293; 98/41 R; 137/512.1; 137/601

[51] Int. Cl.² ........................ G05D 23/275

[58] Field of Search ............ 263/93, 95, 1 G; 137/512.1, 601; 126/285 R, 287.5, 293; 98/41 R, 113

[56] References Cited

UNITED STATES PATENTS

| 322,491 | 7/1885 | Smith | 236/95 |
|---|---|---|---|
| 1,125,810 | 1/1915 | Bunch | 236/95 |
| 1,707,281 | 4/1929 | Sauvage | 236/1 G |
| 1,743,731 | 1/1930 | Scott | 236/1 G |
| 1,927,606 | 9/1933 | Hambrick | 236/95 |
| 2,088,037 | 7/1937 | Schelfhout | 236/1 G |
| 2,112,554 | 3/1938 | Beam | 236/1 G |
| 2,467,577 | 4/1949 | Baldwin | 126/293 |
| 2,837,991 | 6/1958 | De Roo | 98/41 R |
| 3,010,381 | 11/1961 | Glass | 98/41 R |
| 3,384,112 | 5/1968 | Smith | 137/512.1 |
| 3,533,438 | 10/1970 | Smith | 137/601 |
| 3,592,240 | 7/1971 | Hedrick | 137/601 |
| 3,921,900 | 11/1975 | Cole | 236/93 R |

Primary Examiner—John J. Camby
Assistant Examiner—Henry C. Yuen
Attorney, Agent, or Firm—Carl B. Fox, Jr.

[57] ABSTRACT

Automatic damper having pivotal semi-circular vanes which are moved to open position by pivotal movement of a longitudinal element disposed along the central gap between the vanes. The movement of the longitudinal element is controlled by a temperature responsive element. Retraction of the longitudinal element causes closing of the vanes. A J-slot arrangement locks the vanes in open position.

7 Claims, 4 Drawing Figures

AUTOMATIC DAMPER

BACKGROUND OF THE INVENTION

Most automatic dampers of the type used in ventilation systems are operated by air pressure caused by the operation of a fan or blower. When the fan or blower is started, the pressure of air impelled by the fan or blower moves the damper vanes to open positions. When the fan or blower is stopped, the damper vanes are moved to closed positions, either by gravity or by the bias of a spring. The damper, therefore, is open when the fan or blower is operating and closed when the fan or blower is not operating. According to this method of operation, the damper is not opened in response to temperature, which is the most efficient method of operation. By provision of a damper which is opened when a certain temperature is reached, ventilation may be achieved without operation of the fan or blower until such time as a still higher temperature is reached when the fan or blower may be started in operation. In this way, ventilation may be accomplished without expenditure for power for operating the fan or blower during intermediate temperature periods when the fan or blower operation is not really necessary.

SUMMARY OF THE INVENTION

According to the invention, an automatic damper is provided which opens and closes in response to changes of temperature. When the temperature reaches a certain elevation, the damper is automatically opened. When the temperature drops below the same temperature level, the damper is automatically closed. In association with the damper, a fan or blower may be provided which commences operation at a temperature higher than that which causes opening of the damper, and which is stopped in operation when the temperature drops to the higher temperature, above the temperature at which the damper will be closed. This procedure for fan and damper operation is outlined in copending application Ser. No. 556,694, filed Mar. 10, 1975, and does not form a part of the invention. The automatic damper hereby provided is useful in connection with the aforesaid fan-damper operating procedure.

According to the invention, an automatic damper is provided which is opened at a certain temperature elevation, and closed when the temperature drops to the same temperature. A pair of pivotal vanes are disposed to close a conduit or opening, the inner vane edges being disposed closely together. A longitudinal element is disposed along the gap or crack between the two vanes. The longitudinal element is pivotally mounted at one of its ends, for pivotal movement toward and away from the vanes. A temperature responsive device, such as a bellows or gas filled diaphragm is disposed to pivot the longitudinal element between its vane opening and vane closing positions. Pins carried by the vanes are moved along J-slots in a plate carried by the longitudinal element, causing the dampers to be locked in their open positions whereby operation of a fan or blower at one side of the dampers will not cause them to close when fan or blower operation is discontinued. An adjustment is provided whereby the temperature at which the damper will open and close may be varied as desired. The apparatus afforded by the invention is designed for use particularly with turbine ventilators or other forms of roof ventilators, which may or may not have a fan or blower to deliver air therethrough.

A principal object of the invention is to provide an automatic damper which will open and close in response to changes in temperature. Another object of the invention is to provide such apparatus which is locked in open position whereby discontinuation of fan operation adjacent thereto will not cause closing of the damper.

A further object of the invention is to provide such apparatus which is simple in construction and operation, and which is dependable. A still further of object of the invention is to provide such apparatus which is adjustable with regard to the temperature at which it operates.

Other objects and advantages of the invention will appear from the following detailed description of a preferred embodiment, reference being made to the accompanying drawings.

DESCRIPTION OF THE PREFERRED EMBODIMENTS

Figure 1:
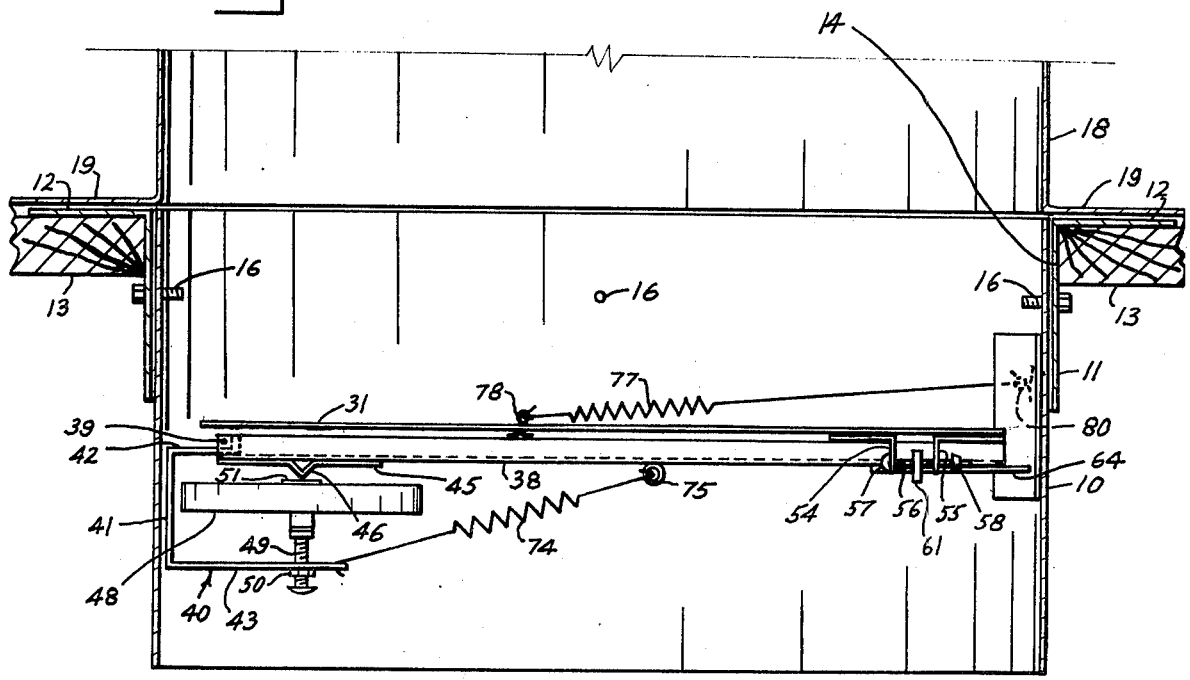
FIG. 1 is a vertical cross section, partly in elevation, showing a preferred embodiment of apparatus according to the invention.
Figure 2:
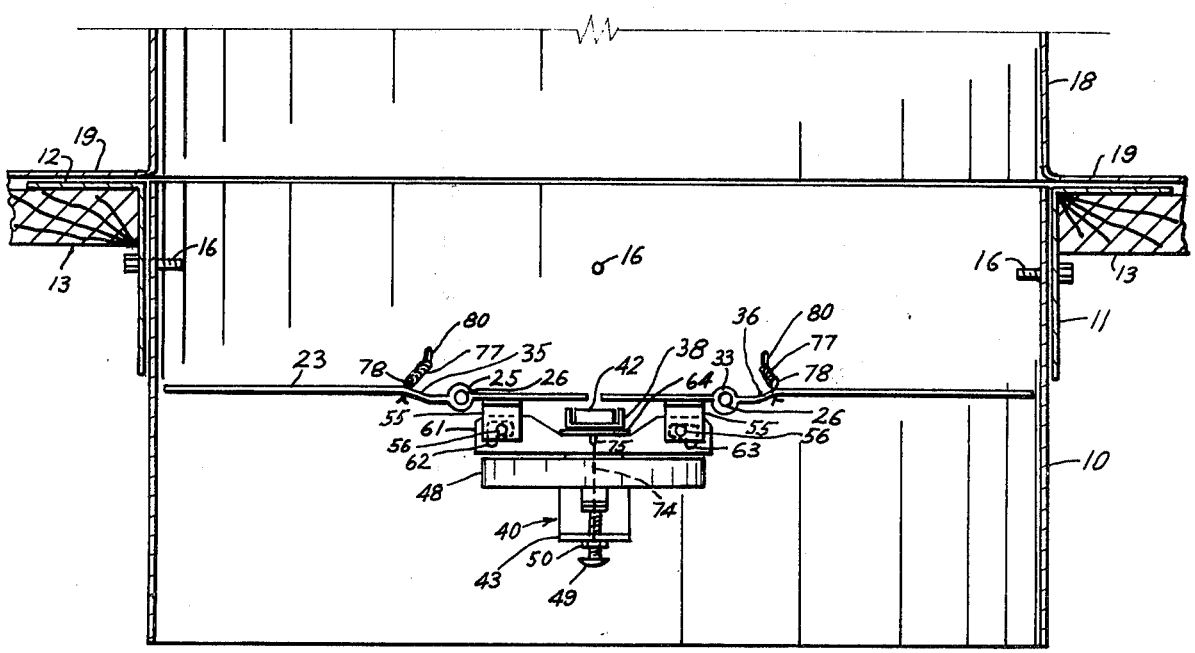
FIG. 2 is a vertical cross section, partly in elevation, taken transverse to FIG. 1.
Figure 3:
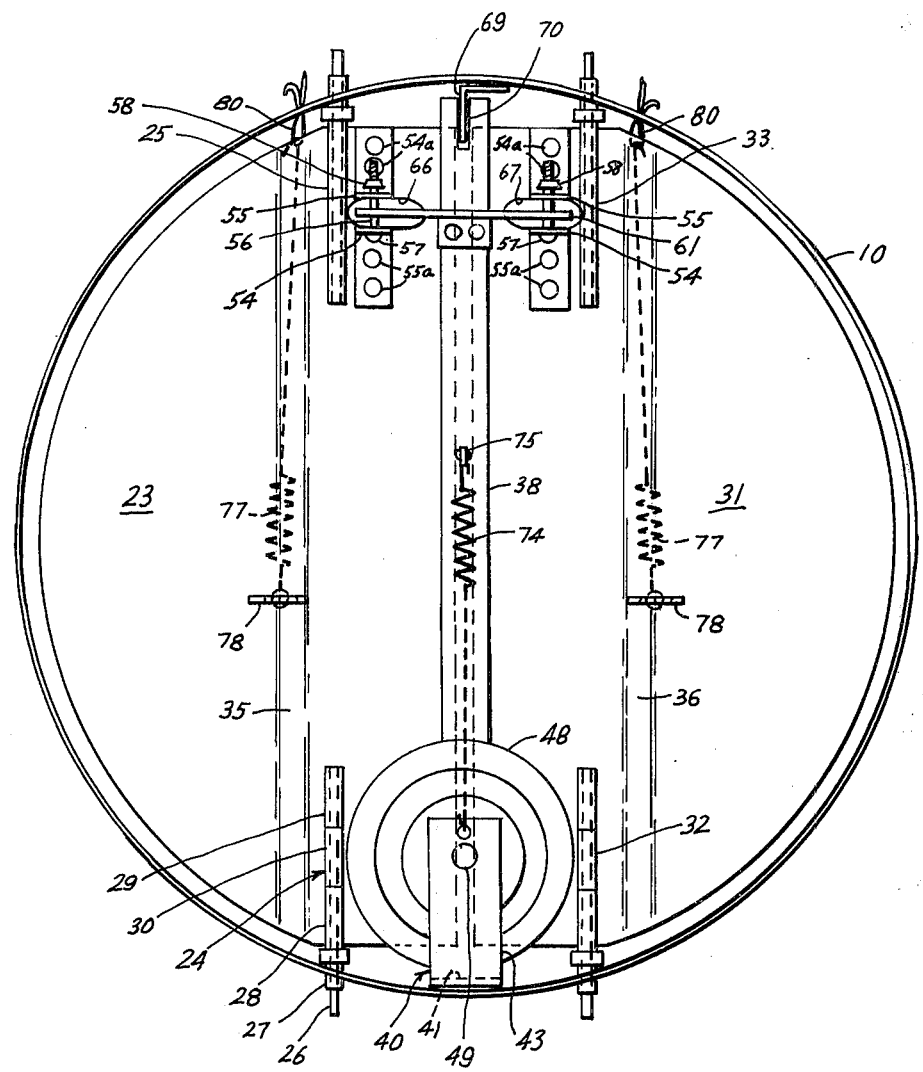
FIG. 3 is a bottom elevation of the apparatus shown in FIGS. 1 and 2.

Referring now to the drawings in detail, the apparatus is shown disposed in a housing 10 having the form of a cylindrical tube or duct. Housing 10 may be of any length or dimensions, and may be a portion of a continuous duct or tube of greater length. The duct may be of a cross sectional shape other than circular. A connection fitting 11 of tubular shape has a surrounding flange 12 disposed flushly against the upper surface of a roof structure 13. Fitting 11 extends through a circular opening 14 through the roof structure. Housing 10 is connected to fitting 11 by a plurality of screws 16 which may, for example, be sheet metal screws. A roof jack 18 having lower surrounding flange 19 will normally be disposed above roof opening 14 as shown in FIGS. 1 and 2, and suitably connected by means not shown. A layer of roofing material (not shown) will normally overlay flange 19 and be sealed thereto.

A fan or blower may be employed in conjunction with the apparatus for impelling air through housing 10 and roof jack 18. A rotary ventilator or other ventilation fitting may be mounted atop roof jack 18. If the fan or blower is disposed above the apparatus within housing 10, disposed to impel air upwardly through housing 10 as it is depicted in FIGS. 1 and 2, the fan or blower operation will cause opening of the damper shown. Preferably, the fan or blower will be disposed below housing 10, to impel air upwardly through housing 10. When so disposed, fan or blower operation will not effect opening or closing of the damper apparatus.

Damper vane 23 is pivotally supported by oppositely disposed pin hinge assemblies 24, 25. Each pin 26 has a flanged collar 27 extending through a suitable opening through the wall of housing 10. Sleeve elements 28, 29 are fixed to pin 26, and sleeve element 30 is affixed to the vane. Vane 31 is similarly mounted by pin hinge assemblies 32, 33. The vanes 23, 31 are each of generally semi-circular shape and each has an intermediate angular upset 35, 36, respectively, which serves to strengthen the vane.

A longitudinal channel element 38, i.e. a bar of channel form, is pivotally connected by pin 39 to a support bracket 40. Bracket 40 has portion 41 affixed to the wall of housing 10 and has inwardly extending upper portion 42 supporting pin 39 and has lower inturned portion 43. Portion 42 extends within the end of the channel formation of longitudinal element 38. Pin 39 extends through the end of element 42 and through holes through the opposite sidewalls of the channel element 38.

Figure 4:
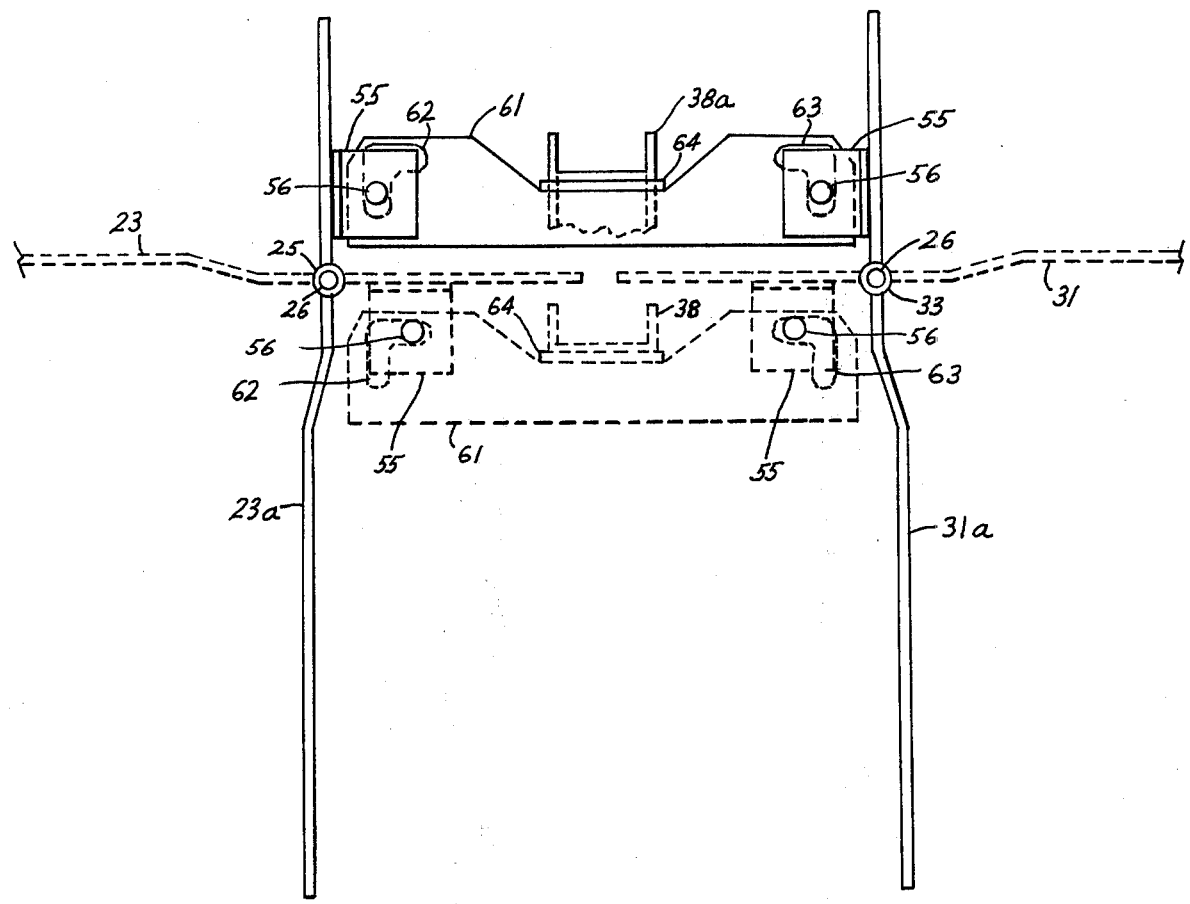
FIG. 4 is an enlarged partial view, showing elements shown in FIG. 2 in moved positions.

A contact plate 45 having downwardly projected central V-formation 46 thereacross is affixed to the end of element 38 and spaced a short distance inward of pin 39. Portion 43 of bracket 40 supports a gas filled diaphragm element 48 the elevation of which is adjustable by means of an adjustable support screw 49 having lock nut 50. The central contact 51 at the upper side of diaphragm element 48 is adapted to engage V-shaped formation 46 of contact plate 45. When diaphragm element 48 expands with increase of temperature, V-formation 46 is pushed upwardly, pivotally moving element 38 upwardly about pin 39. In other words, the right hand end of element 38 as shown in FIG. 1 is elevated, this being the end of element 38 seen in FIG. 2 of the drawings. Each vane 23, 31 carries a pair of L-shaped brackets 54, 55 riveted to the vanes at 54a, 55a between which extends a pin or screw 56. Each pin 56 has a head 57 and at its opposite end is threaded and has screwed thereon a nut 58. The central portion of the pin or screw is not threaded. A shaped plate 61 has J-slots 62, 63 at its opposite ends, through which the two pins extend. Plate 61 is affixed flat to a plate 64 in turn affixed to the underside of element 38. When the end of element 38 toward the right in FIG. 1 and closest to the viewer in FIG. 2 is elevated to a position 38a, shown in FIG. 4, the pins 56 acting through L-shaped brackets 54, 55 pivotally elevate the portions of the vanes inwardly of pin hinges 24, 25 and 32, 33. As the vane opening movement of element 38 means completion, the pins 56 snap over into the downwardly extending outer portions of J-slots 62, 63, this causing the vanes to be locked in open positions until such time as element 38 is moved pivotally downward toward its original position, shown in FIG. 2 and by dashed lines in FIG. 4. Therefore, discontinuation of operation of a fan or blower adjacent to the damper apparatus at either side thereof will not effect closing of the dampers from this position.

The vanes 23, 31 have cut out openings 66, 67, respectively, to permit upward movement of plate 61 in the described manner, that is, to eliminate interference with plates 61 in its upward travel. An L-shaped plate 69 is affixed to the inner wall of housing 10 at the movable end of elememt 38. Plate 64 and longitudinal element 38 have a slot 70 within which the inturned portion of plate 69 is freely disposed. Plate 69 acts as a guide for element 38 in its upward and downward travel. A helical tension spring 74 is connected between the end of bracket portion 43 and a central point of element 38 at cotter pin 75. One end of the spring is put through a suitable opening through bracket portion 43 and the other end of spring 74 is hooked to the cotter pin eye 75. Spring 74 serves to draw element 38 pivotally downwardly as element 48 contracts as a result of drop in temperature. In other words, spring 74 maintains V-formation 46 against diaphragm element contact 51. Two springs 77, each helical tension springs, are each connected by a cotter pin 78 at an intermediate portion of each vane 23, 31 and a cotter pin 80 in a hole through housing 10 at each side of plate 69. Springs 77 bias the vanes 23, 31 toward closed positions so that when element 38 and plate 61 move downwardly the vanes will be closed.

The automatic damper assembly may be inverted from the position shown. The damper mechanism will operate as described in either the position shown or in the upside down position just referred to. The decision as to which position the damper apparatus should have is aminly determined by which temperature is to be used to control the damper. In case the temperature below the vanes is to be utilized in controlling damper opening and closing, then the element 48 should be beneath the damper vanes. If the temperature above the vanes is to determine opening and closing of the vanes, then the apparatus should be inverted with the element 48 above the vanes. Adjustable screw 49 for diaphragm assembly 48 permits adjustment of the temperature range for operation of the damper. Screw 49 may be rotated to move element 48 below contact with V-formation 46, that is, a gap may be provided between elements 46 and 51. In this case, expansion of element 48 must be such as to first engage element 46 and then move it upwardly before the damper will open. With element 51 in contact with element 46 as shown in FIG. 1, the element 38 will be elevated upon any expansion of element 48. Element 48 may be multiple gas filled diaphragm elements placed flushly one against the other, to increase the expansion of the combined element, The apparatus has been constructed using Brower No. 31 gas filled diaphragm wafers. Using two such wafers, the apparatus may be constructed to have a temperature operation range of 30° F. This means that the opening temperature of the damper may be changed by 30° F.

The damper vanes are quick opening. The diaphragm element pressure causes pins 56 to be pressed against the lower sides of the horizontal portions of J-slots 62, 63. When the pressure becomes sufficient, the pins 56 quickly shift or snap to the vertical portions of the J-slots, opening the damper vanes very quickly. The same quick closing action is obtained during closing of the damper vanes.

The dampers afforded by this invention have an additional advantage, not previously mentioned. Dampers of customary form which are opened by air pressure induced by the fan or blower are subject to being accidentally opened or closed by gusts of wind, as during a windstorm or thunderstorm. The dampers provided according to the invention are not either opened or closed by gusts of wind, as the vanes are secured firmly in both their opened and closed positions by the engagements of pins or rods 56 in the J-slots 62, 63.

While a preferred embodiment of the invention has been described and shown in the drawings, many modifications thereof may be made by a person skilled in the art without departing from the spirit of the invention, and it is intended to protect by Letter Patent all forms of the invention falling within the scope of the following claims.

I claim:

1. Automatic damper apparatus, comprising a pair of mirror image vanes pivotal about axes intermediate the widths of the vanes between open and closed positions, means pivotally movable from one side of the inner edges of said vanes in closed position to between said inner edges of said vanes to open said vanes and pivotally movable in the opposite direction to close said vanes, means linking the free end of said pivotally movable means to said inner edges of said vanes comprising pin means on said inner edges of said vanes means and J-slot means on said pivotally movable means having said pin means engaged therein and cooperating to lock said vane means in said open position with said pin means engaged in a transverse J-slot position when said vane means have been opened by said pivotally movable means, and drive means comprising gas filled diaphragm means for moving said pivotally movable means in both directions in response to opposite changes in temperature.

2. Automatic damper, comprising a pair of coplanar vanes in closed positions juxtapositioned side by side along a straight inner edge of each said vane, each said vane being supported for pivotal movement between said closed position coplanar with the other vane and an open position transverse to said coplanar position about an axis spaced parallely outward from said straight inner edge, longitudinal means pivotally supported at one end laterally adjacent one end of said straight inner edges of said vanes in their said coplanar closed positions and extending parallel to said straight inner edges and adjacent thereto and overlapping the inner edge portions of said vanes, means for pivotally moving said longitudinal means from said position parallel to said straight inner edges of said vanes in their said coplanar closed positions and a position between said vanes in their said transverse open positions in response to an increase in temperature to a selected temperature and for pivotally moving said longitudinal means from said position between said vanes in their said transverse open positions to said position parallel to said straight inner edges of said vanes in their said coplanar closed positions in response to a decrease in temperature to said selected temperature, and connection means linking the other end of said longitudinal means to said inner edge portions of said vanes whereby said vanes are opened and closed by said respective pivotal movement of said longitudinal means, said connection means comprising a pin supported by each vane parallel to said inner edge portion of the vane, and plate means carried by said longitudinal means disposed transverse to said pins having J-slot means at each end each having one of said pins disposed therethrough, movement of said vanes to said open positions causing movement of each said pin from one angular portion of the J-slot means through which the pin is disposed to the other angular portion of the J-slot means to lock said vanes in open position until said longitudinal means is moved to close said vane means.

3. The combination of claim 2, said vanes each being semicircular, said damper including a cylindrical tubular housing providing a conduit which said vanes open and close.

4. The combination of claim 2, said means for pivotally moving said longitudinal means comprising a temperature responsive element expanded by increase in temperature and contracted by decrease in temperature.

5. The combination of claim 4, said temperature responsive element comprising gas filled diaphragm means.

6. The combination of claim 5, said vanes each being semicircular, said damper including a cylindrical tubular housing providing a conduit which said vanes open and close.

7. The combination of claim 6, including spring means biasing said longitudinal means toward its vane-closed position and spring means biasing each said vane means toward its closed position.

* * * * *